(12) United States Patent
Li

(10) Patent No.: US 7,636,490 B2
(45) Date of Patent: Dec. 22, 2009

(54) DEBLOCKING FILTER PROCESS WITH LOCAL BUFFERS

(75) Inventor: Jay Li, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 779 days.

(21) Appl. No.: 10/914,440

(22) Filed: Aug. 9, 2004

(65) Prior Publication Data

US 2006/0029288 A1    Feb. 9, 2006

(51) Int. Cl.
    G06K 9/40    (2006.01)
(52) U.S. Cl. .................. 382/268; 382/232; 375/240.24
(58) Field of Classification Search ................ 348/607, 348/845.2; 382/260, 266
    See application file for complete search history.

(56) References Cited

U.S. PATENT DOCUMENTS

| 5,796,875 | A | * | 8/1998 | Read ........................... 382/261 |
| 5,982,459 | A | * | 11/1999 | Fandrianto et al. ....... 348/425.3 |
| 6,240,135 | B1 | * | 5/2001 | Kim ...................... 375/240.01 |
| 6,563,958 | B1 | * | 5/2003 | Andrew ....................... 382/268 |
| 6,922,492 | B2 | * | 7/2005 | Yu et al. ....................... 382/260 |
| 7,084,929 | B2 | * | 8/2006 | Lange et al. ................ 348/716 |
| 2003/0021489 | A1 | * | 1/2003 | Miura et al. ................. 382/260 |
| 2004/0017515 | A1 | * | 1/2004 | Lange et al. ................ 348/607 |
| 2004/0181564 | A1 | * | 9/2004 | MacInnis et al. ............ 708/322 |
| 2004/0208392 | A1 | * | 10/2004 | Raveendran et al. ........ 382/268 |
| 2004/0228415 | A1 | * | 11/2004 | Wang .................... 375/240.29 |
| 2005/0117653 | A1 | * | 6/2005 | Sankaran ................ 375/240.24 |
| 2005/0259744 | A1 | * | 11/2005 | Hellman ................. 375/240.24 |
| 2006/0104357 | A1 | * | 5/2006 | Burazerovic et al. ... 375/240.15 |

FOREIGN PATENT DOCUMENTS

JP    2004240885    *    8/2004

OTHER PUBLICATIONS

Architecture Design For Deblocking Filter in H.264/JVT/AVC, 0-7803-7965-9 IEEE pp. 693-696 Jul. 6-9, 2003.*
Yu-Wen Huang et al, Architecture design for deblocking filter in H.264/JVT/AVC, Jul. 2003, IEEE,0-7803-7965-9, pp. 693-696.*
Yu-Wen Huang, Architecture design for deblocking filter, Jul. 6-9, 2003.IEEE, 0-7803-7965-9, pp. 693-696.*
Real-time deblocking filter for MPEG-4 systems, Huang et al., IEEE, 0-7803-7690-0, 2002, pp. 541-544.*
A deblocking scheme suitable for use in codec, B Deknuydt et al. ,IEEE, 0-7803-1772-6, 1994, pp. 9-12.*
Architecture design for deblocking filter in H.264/JVT/AVC, Yu-Wen et al., IEEE, 0-7803-7965-9, Jul. 2003, pp. 693-696.*

* cited by examiner

Primary Examiner—Brian P Werner
Assistant Examiner—Jayesh Patel
(74) Attorney, Agent, or Firm—McAndrews, Held & Malloy

(57) ABSTRACT

A system and method that optimizes a de-blocking filter process using local buffers. The local buffers may be off of the memory unit in which image data may be stored. The data associated with the image may be loaded into the local buffers. The data may be then fed into a filter, where the de-blocking filter process is executed, and the filtered data may be loaded back into the local buffers. The filtered data may then be written back to its original location in the memory.

15 Claims, 5 Drawing Sheets

DEBLOCKING FILTER PROCESS WITH LOCAL BUFFERS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In block-based coding schemes such as, for example, MPEG or ITU-T, blocking artifacts often occur and smoothness is lost between adjacent blocks in the images. De-blocking techniques are used to restore smoothness in images.

A de-blocking filter may be utilized to smooth out the edges between adjacent blocks within an image. In AVC (also known as ITU-H.264 and MPEG 4, part 10), for example, a de-blocking filter processes macroblocks to the left and above a current macroblock (a macroblock may be a block of 16×16 pixels or smaller). The left, top and current macroblocks are stored in a macroblock buffer and conditional filtering is applied to all 4×4 block edges of a picture.

In vertical edge filtering, 4 pixels on the left of an edge of a 4×4 block (left 4 columns) and 4 pixels on the right of the edge of the 4×4 block (right 4 columns), in a given row, are filtered. If the edge is at macroblock boundary, the left and right pixels are from different rows of the macroblock buffer, since the right pixels are from a row in the current macroblock and the left pixels are from a row in the left macroblock.

Similarly, in horizontal edge filtering, 4 pixels above an edge of a 4×4 block (4 rows) and 4 pixels below the edge of the 4×4 block (4 rows) in a given column are filtered. If the edge is at macroblock boundary, the pixels above and below are from different rows of the macroblock buffer, since the pixels below are from a column in the current macroblock and the pixels above are from a column in the macroblock above.

When performing horizontal edge filtering, for example, 8 pixels have to be read out of the macroblock buffer, 4 above an edge and 4 below the edge. Each pixel resides in a different row of pixels in a macroblock, so reading each pixel from a memory unit such as, for example, a synchronous random access memory (SRAM) requires one clock cycle. After reading out the pixels, the filter is applied to the pixels, and then each pixel is written back to the macroblock buffer on the SRAM, which requires one clock cycle to write one pixel. As a result, at each pixel of the 16×16 block, horizontal or vertical edge filtering requires 8 clock cycles to read the pixels plus 8 clock cycles to write the pixels plus the amount of clock cycles needed for filtering.

One way to make the process faster is to have the components associated with each field stored on a different RAM, and read the needed values simultaneously. However, this solution gets costly in terms of the area used for implementation, since multiple RAMs occupy larger space than one. So, there is a trade off between the space and speed of the process.

The macroblock buffer may be implemented with a single-port SRAM. For every clock cycle, the SRAM can either be read or written, but not both at the same time, and as a result the process time may be slowed down. A dual-port SRAM allows both read and write at the same time, but at the expense of huge area increase.

Another way to make the process faster is to use a flip-flop implementation, where everything is stored in flip-flops. Using flip-flops provides the flexibility of being able to read data out of them at any time without the limitation of reading one pixel at a time. However, a complete flip-flop implementation would require a large number of flip-flips and that would require a large area as well.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that de-blocks images coded using block-based encoders, wherein the image data is stored in memory. The method comprises loading data associated with an edge into local buffers off the memory, feeding the loaded data into a filter, filtering the data, writing the filtered data to the local buffers, and loading the written data to its original location in memory. The data may be loaded into the local buffers in rows. The data may be fed into the filter in rows for vertical edge filtering, and in columns for horizontal edge filtering.

In an embodiment of the present invention, the local buffers may be implemented with flip-flops.

In an embodiment of the present invention, AVC de-blocking may be utilized, for which two local buffers may be used. In another embodiment of the present invention, VC-9 de-blocking may be utilized, for which three local buffers may be used.

The system comprises at least one processor capable of performing the method that de-blocks images coded using block-based encoders, wherein the image data is stored in memory.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to a method and system that utilize local buffers to apply a de-blocking filter in images and video that are coded using block-based encoders. Although the following discussion describes an embodiment of the present invention as used in a video system, it should be understood that embodiments of the present invention may be utilized in other processing techniques in other types of systems such as, for example, audio and communication systems. Also, while the following describes an embodiment of the present invention utilizing a 16×16 macroblock, it should be understood that embodiments of the present invention may be used for larger or smaller macroblocks.

In a representative embodiment of the present invention, the video may be encoded using the AVC standard. "Joint Final Committee Draft (JFCD) of Joint Video Specification (ITU-T Rec. H.264|ISO/IEC 14496-10 AVC)" dated Aug. 8, 2002 describes the AVC standard. Accordingly, "Joint Final Committee Draft (JFCD) of Joint Video Specification (ITU-T Rec. H.264|ISO/EEC 14496-10 AVC)" dated Aug. 8, 2002 is hereby incorporated herein by reference in its entirety.

Figure 1:
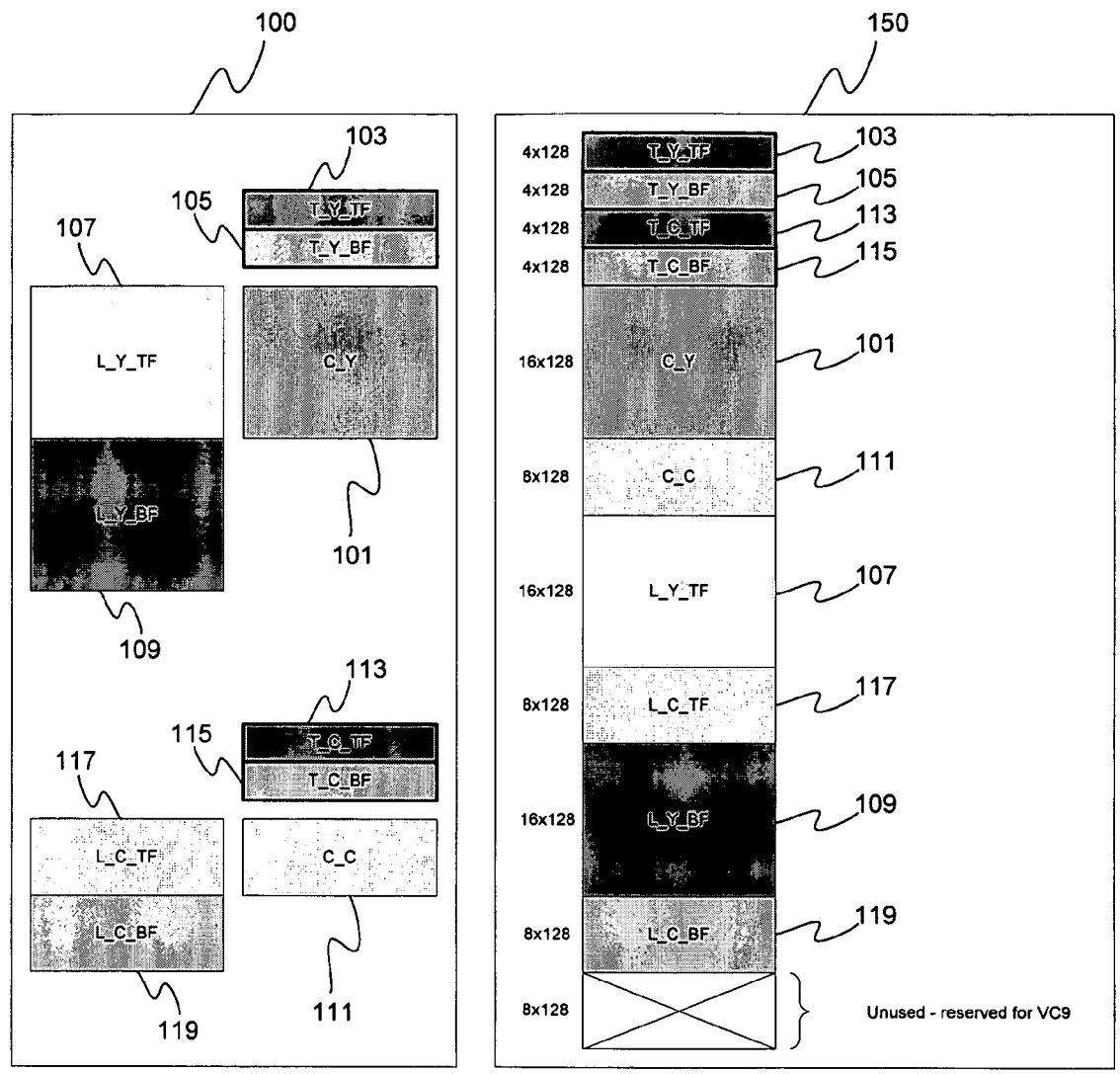
FIG. 1 illustrates an exemplary layout of the pixels in the macroblock buffer in AVC.

FIG. 1 illustrates an exemplary layout of the pixels in the macroblock buffer in AVC. Block 100 shows an exemplary logical view of the layout of the pixels in the macroblock buffer, while block 150 shows an exemplary physical view of the pixels in the macroblock buffer. The macroblock buffer contains the luma values for the current macroblock 101, the luma values for 4 rows of pixels from the top field 103 and the bottom field 105 of the macroblock above, and the luma values for the top field 107 and the bottom field 109 of the macroblock to the left. The macroblock buffer also contains the chroma values for the current macroblock 111, the chroma values for 4 rows of pixels from the top field 113 and the bottom field 115 of the macroblock above, and the chroma values for the top field 117 and the bottom field 119 of the macroblock to the left.

Figure 2A:
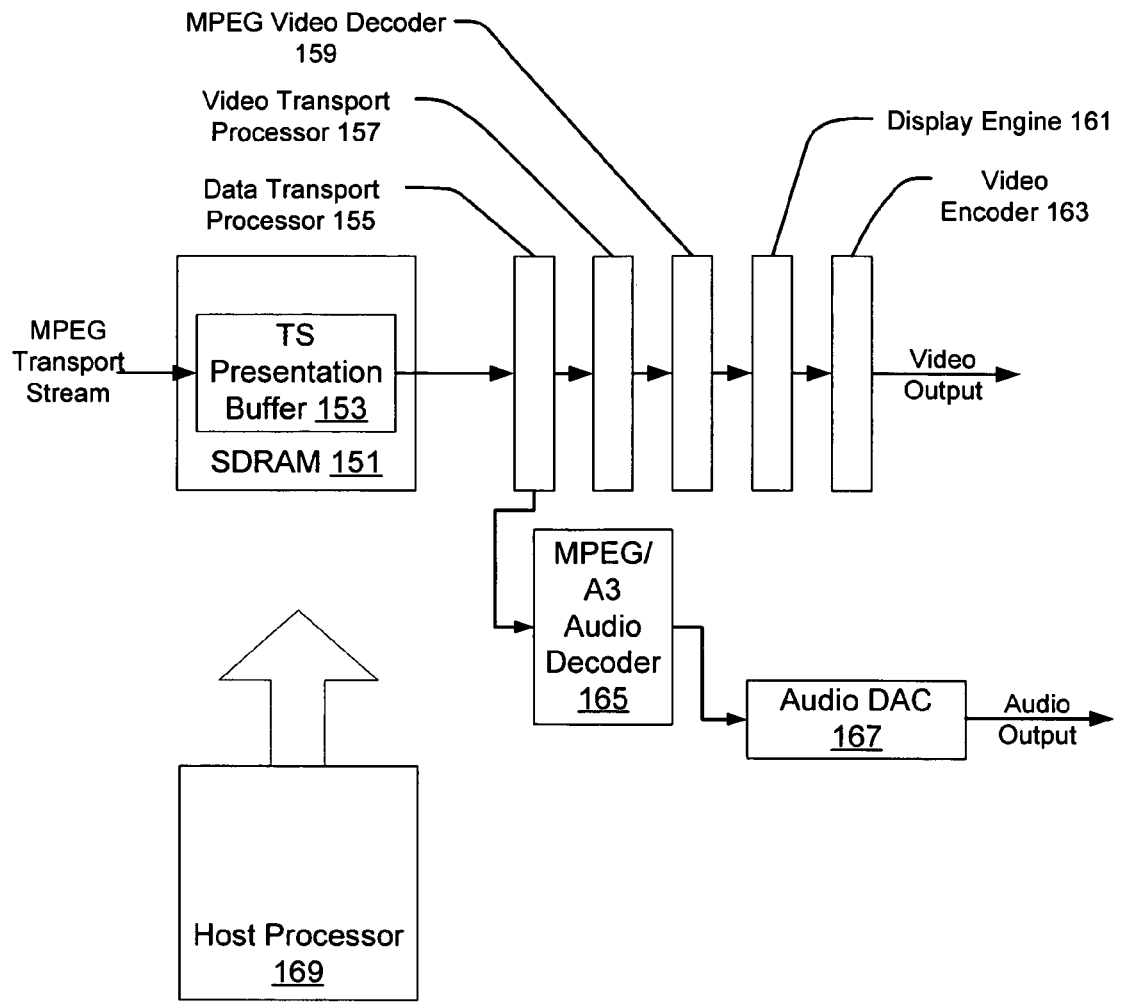
FIG. 2A illustrates a block diagram of an exemplary circuit for decoding video data.

FIG. 2A illustrates a block diagram of an exemplary circuit for decoding video data. Video data may be received and stored in a presentation buffer 153 within a Synchronous Dynamic Random Access Memory (SDRAM) 151.

The data output from the presentation buffer 153 may then be passed to a data transport processor 155. The data transport processor 155 may de-multiplex the transport stream into packetized elementary stream constituents, and may pass the audio transport stream to an audio decoder 165 and the video transport stream to a video transport processor 157 and then to a MPEG video decoder 159. The audio data may then be sent to the output blocks, and the video may be sent to a display engine 161.

The display engine 161 may scale the video picture, render the graphics, and construct the complete display. Once the display is ready to be presented, it may be passed to a video encoder 163 where it may be converted to analog video using an internal digital to analog converter (DAC). The digital audio may be converted to analog in an audio digital to analog converter (DAC) 167. The display engine 161, may then display the decoded images onto a display device, e.g. monitor, television screen, etc., at the proper time and at the correct spatial and temporal resolution.

A conventional system may utilize one processor to implement the decoder 159 and display engine 161. The decoding and display processes may be implemented as firmware in SRAM executed by a processor. The decoding process and many parts of the displaying process may be very hardware-dependent. Additionally, the decoding process may be computationally intense. In an embodiment of the present invention, a host processor 169 may oversee the processes associated with the different parts of the decoder.

Figure 2B:
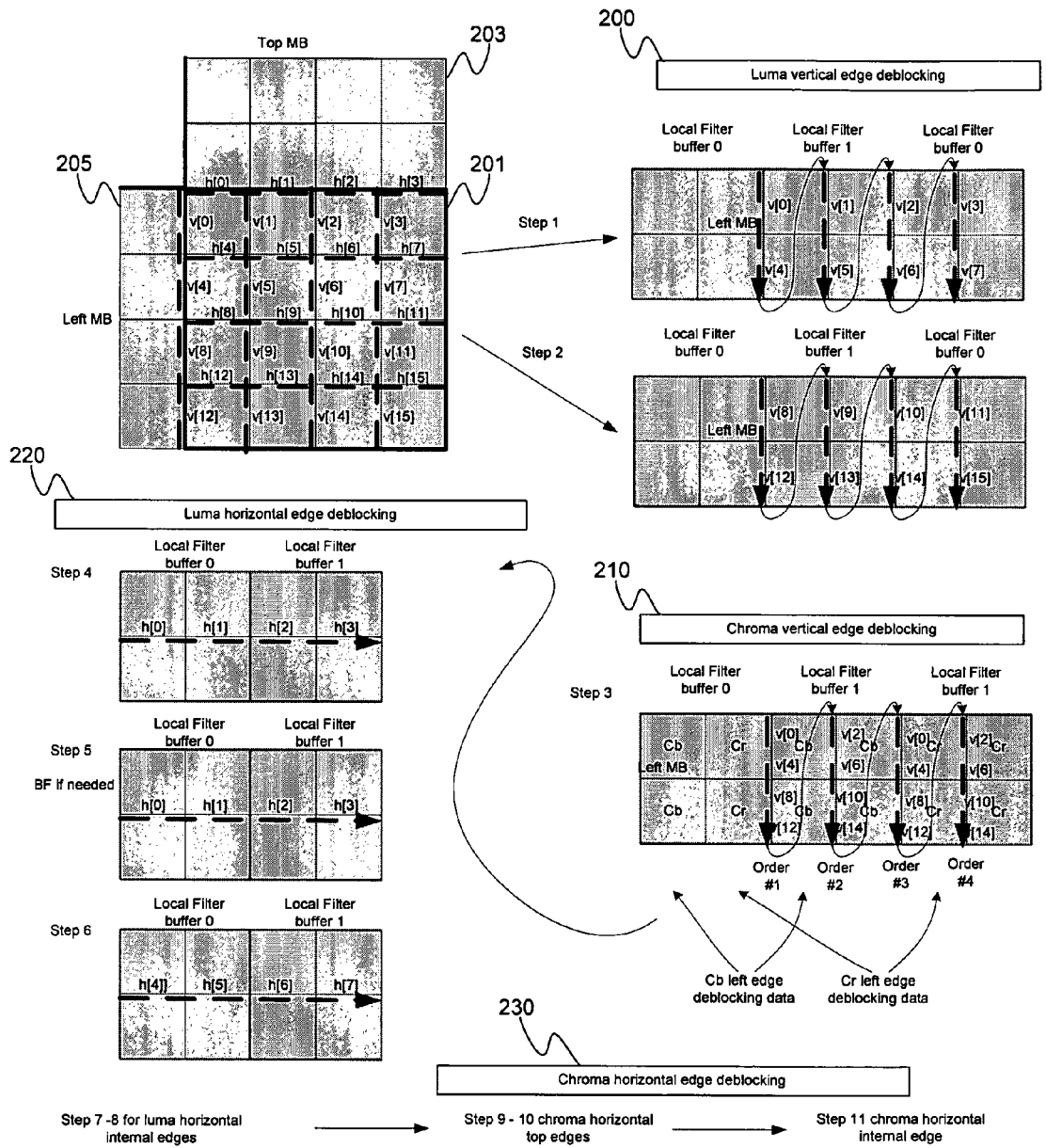
FIG. 2B illustrates exemplary steps of AVC de-blocking using local filter buffers, in accordance with an embodiment of the present invention.

FIG. 2B illustrates exemplary steps of AVC de-blocking using local filter buffers, in accordance with an embodiment of the present invention. A macroblock of data such as, for example, the 16×16 macroblock 201, may be divided into 4×4 blocks of luma data, where each block may be represented by a square. Each 4×4 block may have a horizontal edge on the top and a vertical edge on the left, which may be the edges along which the de-blocking filter may be applied.

In a representative embodiment of the present invention, two local filter buffers may be utilized, local filter buffer 0 and local filter buffer 1. In luma vertical edge de-blocking 200, 4×4 blocks from macroblock 205, which may be to the left of the current macroblock 201, may be loaded into local filter buffer 0, where the loaded 4×4 blocks may be the ones to the left of vertical edges v[0] and v[4]. The 4×4 blocks from macroblock 201 associated with vertical edges v[0] and v[4] may then be loaded in to local filter buffer 1 in addition to the 4×4 blocks associated with vertical edges v[1] and v[5]. The data may then be read from local filter buffer 0 and local filter buffer 1 to do the filtering. When the data is filtered, it may be written back to local filter buffer 0 and local filter buffer 1. When the filtering is done on vertical edges v[0] and v[4] and the data is written back to the local filter buffers, the data to the left of v[0] and v[4], i.e. the data from the left macroblock 205 may be overwritten in local filter buffer 0 by the next 4×4 blocks of data to be filtered. The next 4×4 blocks of data to be filtered may be associated with vertical edges v[2] and v[6] and the 4×4 blocks associated with vertical edges v[3] and v[7]. While one local filter buffer is pre-loading with SRAM data, the filter element may be working on the data from the other local buffer. After filtering, the filter element may output filtered data and store the data back into the local filter buffer.

In a representative embodiment of the present invention, while the data from local filter buffer 0 is being loaded back to its location within the memory, the filter may be processing the data associated with vertical edges v[1] and v[5]. Local filter buffer 0 may unload data back to the memory location associated with macroblock 205, after which local filter buffer 0 may be loaded with new data from macroblock 201 associated with edges v[2], v[3], v[6], and v[7]. At the same time, the filter element may be working on the data in local filter buffer 1. When the filtering is completed on the data from local filter buffer 1, which may be associated with v[2] and v[6], the filtered data (to the left of v[2] and v[6]) may be written back to local filter buffer 1. When completed, data from local filter buffer 1 may be written back to the memory location associated with macroblock 201. When the filtering is completed on the data associated with the vertical edges v[3] and v[7], the filtered data may be written back to local filter buffer 0. The data from the 4×4 blocks from macroblock 205, to the left of the 4×4 blocks associated with vertical edge v[8] and v[12] may be loaded to local filter buffer 0, and the same process used to filter the luma data along the vertical edges v[0], v[4], v[1], v[5], v[2], v[6], v[3], and v[7], may be repeated to filter the luma data along the vertical edges v[8], v[12], v[9], v[13], v[10], v[14], v[11], and v[15].

In chroma vertical edge de-blocking 210, the chroma values from the 4×4 blocks to the left of a vertical edge such as, for example, the 4×4 blocks from the left macroblock 205 may be loaded into local filter buffer 0, and the chroma values from the 4×4 blocks in macroblock 201 may be loaded into local filter buffer 1. In a representative embodiment of the present invention, the images may be encoded using 4:2:0 or 4:2:2, where the chroma data is half as much as the luma data. In such an embodiment, each 4×4 block may only contain 2×2 chroma data. For example, the chroma blue data associated with the whole macroblock 201 may be loaded into local filter buffer 1 and read from memory to be filtered using the chroma blue data from the blocks left of the vertical edge. The filtered chroma blue data may then be written back to the local filter buffer in memory, and then loaded back to its original location in the memory within the macroblock. The chroma red data associated with the macroblock 201 may then be loaded into local filter buffer 1 and processed similar to the chroma blue data using the chroma red data from the blocks left of the vertical edge.

For luma horizontal edge de-blocking 220, four 4×4 blocks from macroblock 203, which may be above the horizontal edge of the current macroblock 201 and four 4×4 blocks below the horizontal edge, may be loaded into local filter buffer 0 and local filter buffer 1. The data may be loaded into the buffers in rows. For example, the fourth row above the horizontal edges h[0], h[1], h[2] and h[3], which may be the top row of data in the bottom 4×4 blocks of macroblock 203, may be loaded into the top row of local filter buffer 0 and local filter buffer 1. The following row may then be loaded into the buffers, and so on, up to the fourth row below the horizontal edges h[0], h[1], h[2] and h[3], which may be the bottom row of data in the top 4×4 blocks of macroblock 201. The columns of luma data in local filter buffer 0 and local filter buffer 1 may then be from the memory, filtered, and written back to memory at the local filter buffers. The filtered data may then be loaded back to its original location row by row, similar to the way it was loaded to the local filter buffers.

In a representative embodiment of the present invention, the process may then be repeated for the same horizontal edges, for the bottom field, when in interlaced mode. In another embodiment of the present invention, the process may then be repeated for the next set of horizontal edges, i.e. h[4], h[5], h[6] and h[7].

Upon completion of the luma horizontal edge de-blocking 220, the chroma horizontal edge de-blocking 230 may take place. The same process may be used for the chroma horizontal edge de-blocking as for the luma horizontal edge de-blocking. There may be half as much chroma data as luma, and half as many steps may be required to complete filtering of the horizontal edges in a macroblock for chroma as may be required for luma.

In another representative embodiment of the present invention, the video may be encoded using the VC-9 standard. "Proposed SMPTE Standard for Television: VC-9 Compressed Video Bitstream Format and Decoding Process" dated Mar. 31, 2004 describes the VC-9 standard. Accordingly, "Proposed SMPTE Standard for Television: VC-9 Compressed Video Bitstream Format and Decoding Process" dated Mar. 31, 2004 is hereby incorporated herein by reference in its entirety.

Figure 3:
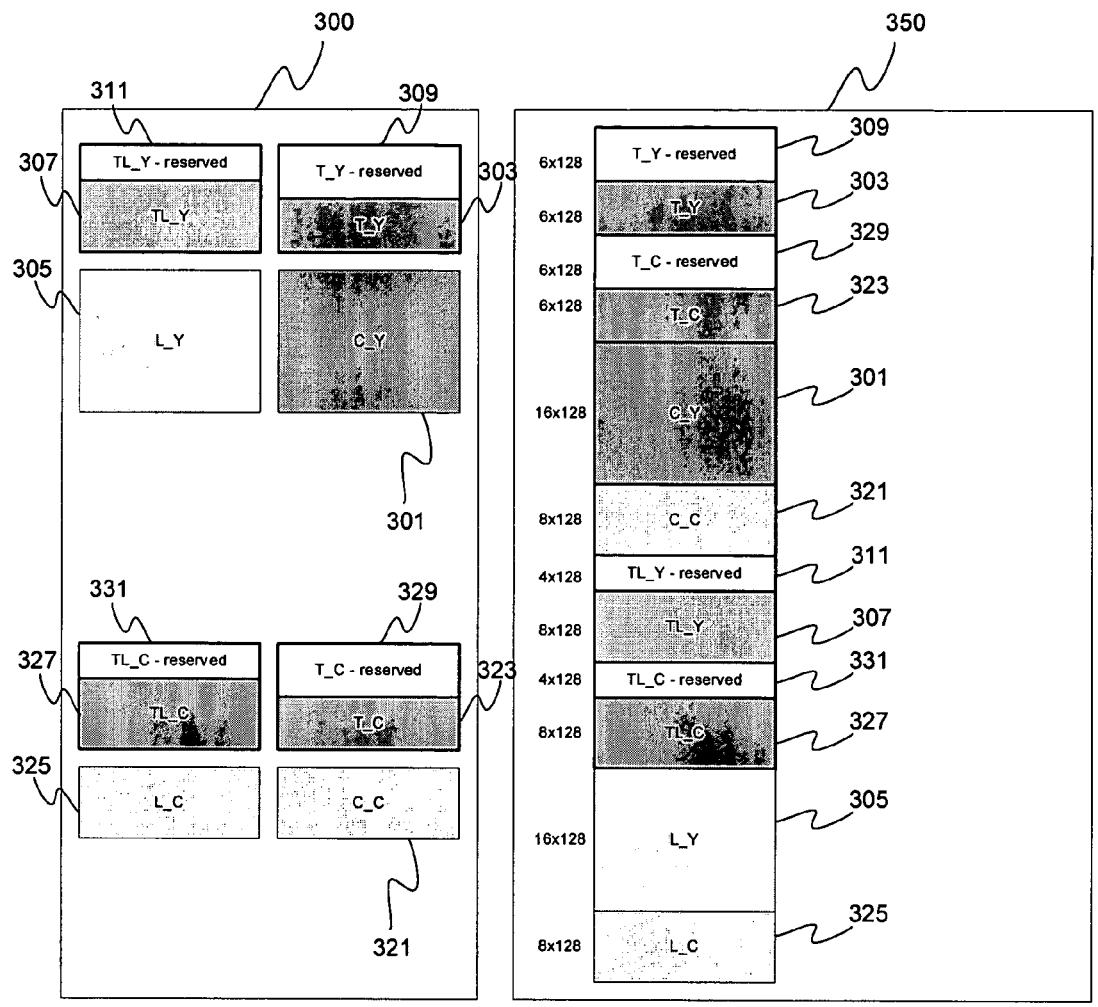
FIG. 3 illustrates an exemplary layout of the pixels in the macroblock buffer in VC-9.

FIG. 3 illustrates an exemplary layout of the pixels in the macroblock buffer in VC-9. Block 300 shows an exemplary logical view of the layout of the pixels in the macroblock buffer, while block 350 shows an exemplary physical view of the pixels in the macroblock buffer. The macroblock buffer may contain the luma values for the current 16×16 macroblock 301, the luma values for 6 rows of pixels from the top macroblock 303, the luma values for the left 16×16 macroblock 305, and the luma values for 8 rows of data from the top left macroblock 307. The macroblock buffer may also contain the chroma values for the current macroblock 321, the chroma values for 6 rows of pixels from the top macroblock 323, the chroma values for the left macroblock 325, and the chroma values for 8 rows of data from the top left macroblock 327. In one embodiment, where the video may be in interlaced form, the macroblock buffer may also contain luma values for another 6 rows from the top macroblock 309, and luma values for another 4 rows of data from top left macroblock 311. The macroblock buffer may also contain chroma values for another 6 rows from the top macroblock 329, and chroma values for another 4 rows of data from top left macroblock 331.

Figure 4:
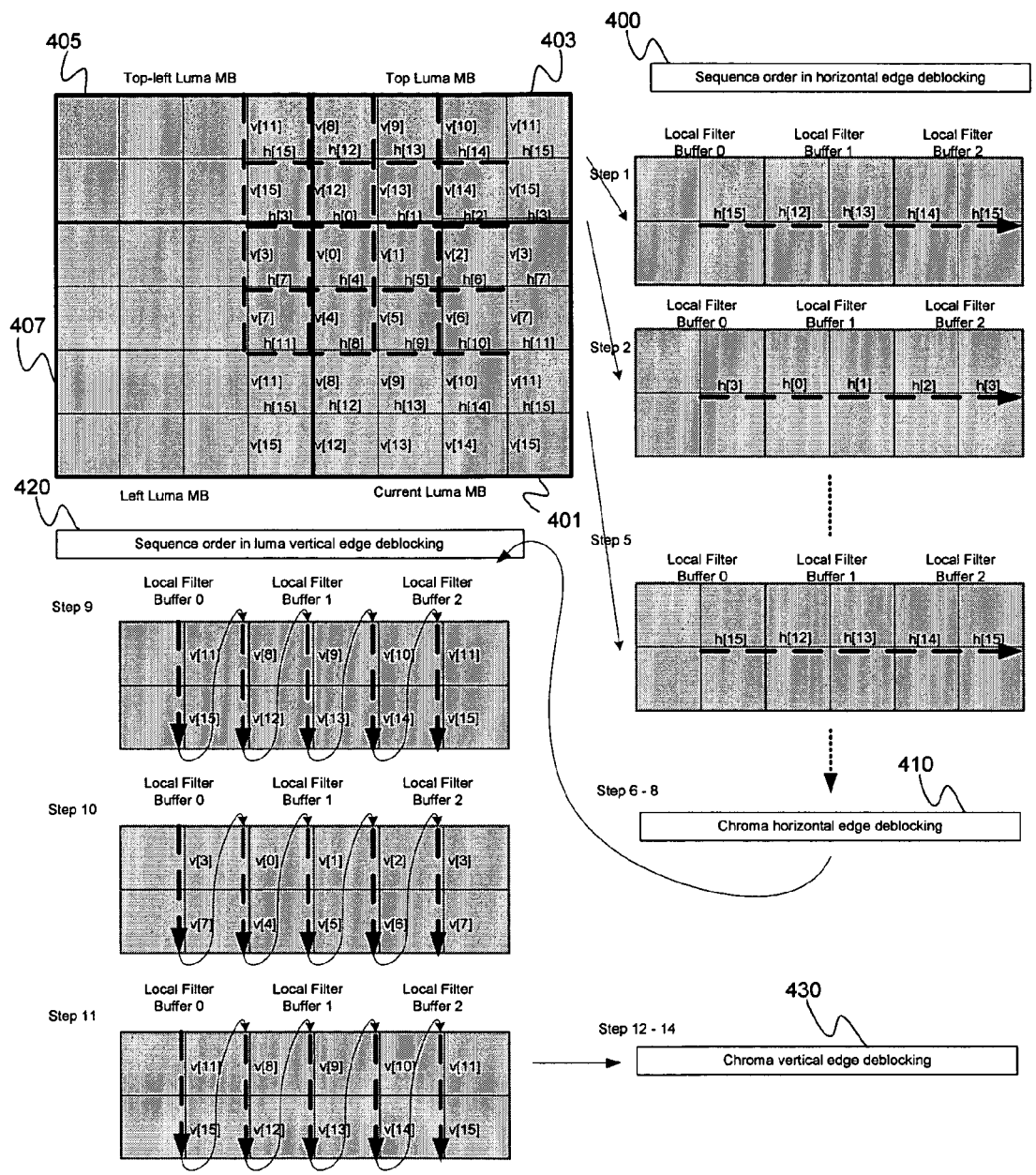
FIG. 4 illustrates exemplary steps of VC-9 de-blocking using local filter buffers, in accordance with an embodiment of the present invention.

FIG. 4 illustrates exemplary steps of VC-9 de-blocking using local filter buffers, in accordance with an embodiment of the present invention. In an embodiment of the present invention, 3 local filter buffers may be utilized for VC-9 de-blocking. A macroblock of data such as, for example, the 16×16 macroblock 401, may be divided into 4×4 blocks of luma data, where each block may be represented by a square. Neighboring left macroblock 407, top-left macroblock 405, and top macroblock 403 may be available in the SRAM in addition to the current macroblock 401, and may be utilized in the VC-9 de-blocking process.

In an embodiment of the present invention, VC-9 de-blocking may begin with luma horizontal edge de-blocking 400. Local buffer 0 may be pre-loaded with top-left macroblock 405 luma rows. Using 8 clock cycles, 4 rows of pixels above and 4 rows of pixels below edge h[15] may be read from SRAM and written into local buffer 0 using row write mode. The 4 rightmost columns of local buffer 0 may be available for de-blocking and the pixels of those 4 columns may be fed into the filter element. Right after local filter buffer 0 is pre-loaded with pixels, 4 rows of pixels above and below horizontal edges h[12] and h[13] are pre-loaded into local filter buffer 1 from the SRAM top macroblock 403. De-blocking may then start on the horizontal edges h[12] and h[13]. The filter element may read the columns starting from the leftmost and proceed to the rightmost column. Right after local filter buffer 1 is pre-loaded with pixels, 4 rows of pixels above and below horizontal edges h[14] and h[15] may be pre-loaded into local filter buffer 2 from the SRAM top macroblock 403.

While local filter buffer 2 is pre-loading with pixels from the SRAM, the first filtered results may be output from the filter element and stored into local filter buffer 0 rightmost 4 columns. These data may then be written back to the SRAM top-left macroblock 405 from local filter buffer 0 using row read mode. Since VC-9 de-blocking element outputs filtered 1 pixel above and below the edge, only 2 rows of filtered data may be written back to the SRAM. Local filter buffer 0 may be empty and work on horizontal edge h[3] may begin while waiting for the filtered result stored in local filter buffer 1. After local filter buffer 1 is filtered and the data is written back to the SRAM top macroblock 403, local filter buffer 1 may begin working on the next horizontal edges h[0] and h[1]. While local filter buffer 1 empties out the filtered data back to the SRAM and gets pre-loaded with the next edge data, filtered data may be written to local filter buffer 2. The filtered data in local filter buffer 2 may then be written to the SRAM top macroblock 403. Local filter buffer 2 may then work on the next horizontal edges h[2] and h[3].

The horizontal edge process 400 may be repeated until all horizontal edges on luma are completed. The same horizontal edge process may then be applied to the chroma data for chroma horizontal edge de-blocking 410, until all horizontal edges on chroma are completed.

Following completion of horizontal edge de-blocking, vertical edge filtering may begin with luma vertical edge de-blocking 420. Initially, 8 rows of the top-left macroblock 405 may be loaded into local filter buffer 0 using the row write mode. Within each row, 4 pixels may be to the left and 4 pixels may be to the right of edges v[11] and v[15]. Another 8 rows of the top macroblock 403 may then be loaded into local filter buffer 1, where within each row, 4 pixels may be to the left and 4 pixels to the right of edges v[9] and v[13]. Yet another 8 rows of the top macroblock 403 may be loaded into local filter buffer 2, where within each row, 4 pixels may be to the left and 4 pixels to the right of edges v[11] and v[15].

While local filter buffer 1 is pre-loading with SRAM data, the filter element may be working on the data from local filter buffer 0 for the top macroblock 403 vertical edge v[11] and v[15] pixels. After filtering, the filter element may output filtered data and store the data back into local filter buffer 0.

While local filter buffer 2 is pre-loading with SRAM data, the filter element may be working on the data from local filter buffers 0 and 1 for the vertical edge v[8] and v[12] pixels.

After vertical edges v[8] and v[12] are filtered, data in local filter buffer 0 may be filtered and ready to write back to the SRAM. When local filter buffer 2 pre-loading is completed, data from local filter buffer 0 may be written back to the appropriate SRAM location. Since local filter buffer 0 is available again at this point, it may be pre-loaded with pixels from both sides, 4 pixels to the left and 4 pixels to the right of the edge of vertical edges v[3] and v[7] from the SRAM again.

After vertical edges v[9], v[13], v[10], and v[14] are filtered, the filtered pixels in local filter buffer 1 may be written back to the SRAM and local filter buffer 1 may be pre-loaded with pixels from both sides of the vertical edges v[1] and v[5] in the current macroblock 401.

After vertical edges v[11], v[15] are filtered, the filtered pixels in local filter buffer 2 may be written back to the SRAM and local filter buffer 2 may be preloaded with pixels from both sides of the vertical edges v[3] and v[7] in the current macroblock 401.

The luma vertical edge de-blocking process 420 using local filter buffers may be applies to the remaining luma. The chroma may then be filtered using vertical edge de-blocking during the chroma vertical edge de-blocking process 430 similar to the de-blocking process applied to the luma.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for deblocking pixels, said method comprising:
    storing a first plurality of pixels that are proximate to a first edge in a buffer;
    fetching a second plurality of pixels that are proximate to the first edge and pixels that are proximate to a second edge during a single read from a random access memory;
    filtering the first plurality of pixels that are proximate to the first edge and the second plurality of pixels that are proximate to the first edge, thereby resulting in a first plurality of filtered pixels that are proximate to the first edge and a second plurality of filtered pixels that are proximate to the first edge;
    filtering the pixels that are proximate to the second edge;
    writing the first plurality of filtered pixels that are proximate to the first edge to the random access memory while filtering the pixels that are proximate to the second edge; and
    wherein the first plurality of pixels and the second plurality of pixels and the pixels that are proximate to the second edge are luma pixels.

2. The method of claim 1, wherein fetching comprises fetching a first plurality of pixels that are proximate to a third edge during the single read.

3. The method of claim 2, wherein writing further comprises writing filtered pixels that are proximate to a fourth edge while filtering the pixels that are proximate to the second edge.

4. The method of claim 1, wherein the first edge and second edge are vertical edges.

5. The method of claim 1, wherein the first edge and the second edge are horizontal edges.

6. The method of claim 1, wherein the random access memory comprises SRAM.

7. A system for deblocking pixels, said system comprising:
    a buffer for storing a first plurality of pixels that are proximate to a first edge;
    a memory controller for fetching a second plurality of pixels that are proximate to the first edge and pixels that are proximate to a second edge during a single read from a random access memory;
    a filter for filtering the first plurality of pixels that are proximate to the first edge and the second plurality of pixels that are proximate to the first edge, thereby resulting in a first plurality of filtered pixels that are proximate to the first edge and a second plurality of filtered pixels that are proximate to the first edge;
    wherein the filter filters the pixels that are proximate to the second edge;
    wherein the memory controller writes the first plurality of filtered pixels that are proximate to the first edge to the random access memory while filtering the pixels that are proximate to the second edge; and
    wherein the first plurality of pixels and the second plurality of pixels and the pixels that are proximate to the second edge are luma pixels.

8. The system of claim 7, wherein the fetching comprises fetching a first plurality of pixels that are proximate to a third edge during the single read.

9. The system of claim 8, wherein writing further comprises writing filtered pixels that are proximate to a fourth edge while filtering the pixels that are proximate to the second edge.

10. The system of claim 7, wherein the first edge and second edge are vertical edges.

11. The system of claim 7, wherein the first edge and second edge are horizontal edges.

12. The system of claim 7, wherein the random access memory comprises SRAM.

13. The system of 7 wherein the second plurality of pixels that are proximate to the first edge are received by the filter directly from the memory controller.

14. A method for deblocking pixels, said method comprising:

storing a first block comprising pixels that are proximate to a first edge in a buffer;

loading a second block and a third block, the second block comprising pixels that are proximate to the first edge and pixels that are proximate to a second edge, the third block comprising pixels that are proximate to the second edge and pixels that are proximate to a third edge;

filtering the pixels of the first block and the second block that are proximate to the first edge; and overwriting the first block with a fourth block comprising pixels that are proximate to the third edge and a fourth edge while filtering the pixels from the second and third block that are proximate to the second edge.

15. The method of claim 14, further comprising:

loading a fifth block comprising pixels that are proximate to the fourth edge and pixels that are proximate to a fifth edge while filtering the pixels from the second and third block that are proximate to the second edge.

\* \* \* \* \*

UNITED STATES PATENT AND TRADEMARK OFFICE
CERTIFICATE OF CORRECTION

| | | |
|---|---|---|
| PATENT NO. | : 7,636,490 B2 | Page 1 of 1 |
| APPLICATION NO. | : 10/914440 | |
| DATED | : December 22, 2009 | |
| INVENTOR(S) | : Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Eleventh Day of January, 2011

David J. Kappos
*Director of the United States Patent and Trademark Office*